US 7,869,196 B2
Jan. 11, 2011

(12) United States Patent
Itoh

(10) Patent No.: US 7,869,196 B2
(45) Date of Patent: Jan. 11, 2011

(54) ELECTRONIC APPARATUS

(75) Inventor: Yuusuke Itoh, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 340 days.

(21) Appl. No.: 11/646,566

(22) Filed: Dec. 28, 2006

(65) Prior Publication Data
US 2008/0158792 A1     Jul. 3, 2008

(51) Int. Cl.
*G06F 1/16* (2006.01)
(52) U.S. Cl. .............. 361/679.01; 455/556.2; 701/209; 430/283.1; 340/425.5
(58) Field of Classification Search ........... 455/414, 455/556, 13.1, 130, 569.1, 556.2, 346, 3.06, 455/321, 418, 553.1, 557, 456.5, 517, 556.1; 701/213, 211, 210, 208, 201, 1, 36, 48, 33, 701/209, 207, 303, 418, 553.1, 557, 456.5, 701/517, 556.1; 348/148, 118; 430/270.1, 430/325, 283.1; 342/357.08, 357.1; 340/426.34, 340/995.26, 425.5, 988; 361/679.01, 679.33, 361/679.37, 679.43, 679.41, 679.32, 814, 361/759; 710/8, 303
See application file for complete search history.

(56) References Cited

U.S. PATENT DOCUMENTS

| | | | |
|---|---|---|---|
| 4,178,319 A | 12/1979 | Chattha | |
| 4,542,421 A | 9/1985 | Fujibayashi | |
| 5,079,577 A * | 1/1992 | Nomura | ......................... 396/72 |
| 5,493,479 A | 2/1996 | Takahashi | |
| 5,510,957 A | 4/1996 | Takagi | |
| 5,537,673 A | 7/1996 | Nagashima et al. | |
| 5,592,389 A | 1/1997 | La Rue et al. | |
| 5,627,547 A | 5/1997 | Ramaswamy et al. | |
| 5,705,975 A | 1/1998 | Serino et al. | |
| 5,733,714 A | 3/1998 | McCulloch et al. | |
| 5,774,828 A | 6/1998 | Brunts et al. | |
| 5,794,164 A | 8/1998 | Beckert et al. | |
| 5,845,282 A | 12/1998 | Alley et al. | |
| 5,862,468 A | 1/1999 | Kim | |
| 5,913,699 A * | 6/1999 | Zielke | ......................... 439/632 |
| 5,917,435 A | 6/1999 | Kamiya et al. | |
| 5,941,933 A | 8/1999 | Miyake et al. | |

(Continued)

FOREIGN PATENT DOCUMENTS

DE       198 03 178 A1      7/1999

(Continued)

OTHER PUBLICATIONS

M. Mukasa. "Detachable-Panel Connectors Respond to Needs for Anti-Theft Designs," JEE Journal of Electronic Engineering 30, Feb. 1993, No. 314, Tokyo, Japan.

(Continued)

*Primary Examiner*—Hung V Duong
(74) *Attorney, Agent, or Firm*—Oliff & Berridge, PLC

(57) ABSTRACT

An electronic apparatus to which a portable apparatus is attachable, the electronic apparatus including: a main body portion; a front face portion; and a flexible board connecting the main body portion and the front face portion, and the front face portion is arranged to be capable of being displaced with respect to the main body portion; and a recess portion is defined at the front face portion to be capable of partially accommodating a distorted portion of the flexible board to be distorted when the flexible board is displaced.

8 Claims, 15 Drawing Sheets

U.S. PATENT DOCUMENTS

| | | | |
|---|---|---|---|
| 5,964,821 A | 10/1999 | Brunts et al. |
| 5,999,126 A | 12/1999 | Ito |
| 6,009,355 A | 12/1999 | Obradovich et al. |
| 6,023,290 A | 2/2000 | Seita |
| 6,055,478 A | 4/2000 | Heron |
| 6,091,956 A | 7/2000 | Hollenberg |
| 6,093,977 A | 7/2000 | Fujita et al. |
| 6,119,060 A | 9/2000 | Takayama et al. |
| 6,125,326 A | 9/2000 | Ohmura et al. |
| 6,136,507 A | 10/2000 | Morigaki |
| 6,148,253 A | 11/2000 | Taguchi et al. |
| 6,150,925 A | 11/2000 | Casazza |
| 6,163,079 A | 12/2000 | Miyazaki et al. |
| 6,202,008 B1 | 3/2001 | Beckert et al. |
| 6,208,932 B1 | 3/2001 | Ohmura et al. |
| 6,243,645 B1 | 6/2001 | Moteki et al. |
| 6,303,266 B1 | 10/2001 | Okino et al. |
| 6,405,049 B2 | 6/2002 | Herrod et al. |
| 6,417,786 B2 | 7/2002 | Learman et al. |
| 6,421,606 B1 | 7/2002 | Asai et al. |
| 6,653,049 B2 | 11/2003 | Pavelchek et al. |
| 6,681,176 B2 | 1/2004 | Funk et al. |
| 6,701,161 B1 | 3/2004 | Wendling |
| 6,791,844 B2 | 9/2004 | Tobishima et al. |
| 6,803,168 B1 | 10/2004 | Padmanaban et al. |
| 6,816,783 B2 | 11/2004 | Hashima et al. |
| 6,993,615 B2 | 1/2006 | Falcon |
| 7,006,845 B2 | 2/2006 | Simon |
| 7,016,986 B2 | 3/2006 | Fasolt |
| 7,062,378 B2 | 6/2006 | Krull et al. |
| 7,079,863 B2 | 7/2006 | Chikaishi |
| 7,117,286 B2 | 10/2006 | Falcon |
| 7,184,003 B2 | 2/2007 | Cupps et al. |
| 7,215,950 B2 | 5/2007 | Mazzara, Jr. et al. |
| 7,216,242 B2 | 5/2007 | Glass et al. |
| 7,222,207 B2 | 5/2007 | Falcon |
| 2002/0024597 A1 | 2/2002 | Arai et al. |
| 2002/0068549 A1 | 6/2002 | Tendler |
| 2002/0137541 A1 | 9/2002 | Lepley et al. |
| 2002/0152027 A1 | 10/2002 | Allen |
| 2003/0022624 A1 | 1/2003 | Sato |
| 2003/0103634 A1 | 6/2003 | Ito |
| 2003/0215736 A1 | 11/2003 | Oberlander et al. |
| 2004/0058656 A1 | 3/2004 | Chikaishi |
| 2004/0204159 A1 | 10/2004 | Van Bosch |
| 2004/0247280 A1 | 12/2004 | Izawa |
| 2005/0139731 A1 | 6/2005 | Park et al. |
| 2006/0031617 A1 | 2/2006 | Falcon |
| 2006/0211256 A1 | 9/2006 | Takei et al. |
| 2008/0130206 A1* | 6/2008 | Itoh ............ 361/679 |
| 2008/0161047 A1 | 7/2008 | Witkowski et al. |
| 2009/0046455 A1* | 2/2009 | Yoshino et al. ....... 362/234 |

FOREIGN PATENT DOCUMENTS

| | | | |
|---|---|---|---|
| EP | 0 507 990 A1 | 10/1992 |
| EP | 0 658 011 A | 6/1995 |
| EP | 1 251 034 A2 | 10/2002 |
| EP | 1 727 019 A1 | 11/2006 |
| GB | 2 287 501 A | 9/1995 |
| GB | 2 336 489 A | 10/1999 |
| JP | U-57-204770 | 6/1956 |
| JP | Y-63-018184 | 5/1988 |
| JP | A 04-238218 | 8/1992 |
| JP | A 07-074479 | 3/1995 |
| JP | A-07-132779 | 5/1995 |
| JP | A-07-156719 | 6/1995 |
| JP | A 08-007977 | 1/1996 |
| JP | A 08-260794 | 10/1996 |
| JP | 08-318792 | 12/1996 |
| JP | A 08-318792 | 12/1996 |
| JP | A 10-16654 | 1/1998 |
| JP | A 10-103999 | 4/1998 |
| JP | A 10-135669 | 5/1998 |
| JP | A 10-199220 | 7/1998 |
| JP | A 11-289173 | 10/1999 |
| JP | 2000-311029 A | 11/2000 |
| JP | A 2001-015936 | 1/2001 |
| JP | A-2001-052473 | 2/2001 |
| JP | 2001-141471 A | 5/2001 |
| JP | A 2001-239895 | 9/2001 |
| JP | A-10-2001-0112146 | 12/2001 |
| JP | A-2002-74922 | 3/2002 |
| JP | A-2002-181555 | 6/2002 |
| JP | A-2002-267461 | 9/2002 |
| JP | A 2002-328026 | 11/2002 |
| JP | A 2003-003554 | 1/2003 |
| JP | 2003-035554 A | 2/2003 |
| JP | 2003-037514 A | 2/2003 |
| JP | A 2003-166848 | 6/2003 |
| JP | A 2003-521825 | 7/2003 |
| JP | A-2003-308686 | 10/2003 |
| JP | 2003-315065 A | 11/2003 |
| JP | A 2004-234794 | 8/2004 |
| JP | 2005-173653 A | 6/2005 |
| JP | A 2005-524570 | 8/2005 |
| KR | 10-2003-0071743 A | 9/2003 |
| KR | 10-2004-0061642 A | 7/2004 |
| KR | 10-2005-0017296 A | 2/2005 |
| KR | 10-2006-0030344 A | 4/2006 |
| KR | 2006-128470 A | 12/2006 |
| WO | WO 98/39852 | 9/1998 |
| WO | WO 99/38728 | 8/1999 |
| WO | WO-2004/092840 A1 | 10/2004 |
| WO | WO 2006/130784 A2 | 12/2006 |

OTHER PUBLICATIONS

U.S. Appl. No. 11/645,629, filed in the U.S.P.T.O. Dec. 27, 2006.
U.S. Appl. No. 11/645,642, filed in the U.S.P.T.O. Dec. 27, 2006.
U.S. Appl. No. 11/645,628, filed in the U.S.P.T.O. Dec. 27, 2006.
U.S. Appl. No. 11/646,539, filed in the U.S.P.T.O. Dec. 28, 2006.
U.S. Appl. No. 11/646,477, filed in the U.S.P.T.O. Dec. 28, 2006.
U.S. Appl. No. 11/645,672, filed in the U.S.P.T.O. Dec. 27, 2006.
U.S. Appl. No. 11/646,557, filed in the U.S.P.T.O. Dec. 28, 2006.
U.S. Appl. No. 11/646,478, filed in the U.S.P.T.O. Dec. 28, 2006.
U.S. Appl. No. 11/646,558, filed in the U.S.P.T.O. Dec. 28, 2006.
U.S. Appl. No. 11/646,498, filed in the U.S.P.T.O. Dec. 28, 2006.
U.S. Appl. No. 11/646,538, filed in the U.S.P.T.O. Dec. 28, 2006.
U.S. Appl. No. 11/646,479, filed in the U.S.P.T.O. Dec. 28, 2006.

* cited by examiner

ELECTRONIC APPARATUS

BACKGROUND OF THE INVENTION

1. Field of the Invention

This invention relates to electronic apparatuses, more particular, to an electronic apparatus to which a portable navigation apparatus is attached.

2. Description of the Related Art

As conventional navigation apparatuses, there are widely known small-sized portable navigation apparatuses with simplified structure and portability (hereinafter, referred to as Portable Navi), also known as Personal Navigation Device (hereinafter, referred to as PND); and in-vehicle navigation apparatuses accommodated and fixed in a recess portion (DIN opening) formed in a dashboard of a vehicle. The in-vehicle navigation apparatuses are capable of guiding with high accuracy by use of the information supplied from vehicles such as vehicle speed, and some of the in-vehicle navigation apparatuses are equipped with audio devices.

In recent years, the navigation apparatuses with portability of the Portable Navi and high-accuracy guide function of the in-vehicle navigation apparatus have been studied.

Japanese Patent Application Publication No. 8-318792, Japanese Patent Application Publication No. 2002-328026, Japanese Patent Application Publication No. 2005-524570, and Japanese Patent Application Publication No. 2001-239895 disclose a configuration where a navigation portion can be detached from an in-vehicle apparatus mounted in a vehicle. By removing the navigation portion from the in-vehicle apparatus, the navigation portion can be used as a Portable Navi of a single unit. Also, as disclosed in Japanese Patent Application Publication No. 2003-166848, the navigation apparatus is taken out of the vehicle and can be used while walking. In addition, when mounted in a vehicle, the navigation apparatus is in a car-navigation mode, and when taken out of the vehicle, the navigation apparatus is in a person-navigation mode.

In most cases, the electronic apparatus is disposed in a dashboard portion between the driver's seat and the front passenger's seat, so the size thereof must have a regulated one as viewed from the front surface thereof. Therefore, a front face portion and a main body portion are provided such that the rear face of the front face portion opposes to the front face of the main body portion when used. The front face portion is displaced from the front face of the main body portion when a memory medium or the like is inserted into or ejected from the insertion/ejection slot thereof arranged at the front face of the main body portion.

A flexible board electrically connected is interposed between the main body portion and the front face portion, and the flexible board is also bent according to the displacement of the front face portion. If there is only a small gap between the main body portion and the front face portion and the curvature radius of the bent flexible board is small, the flexible board will be excessively bent and be degraded mechanically and electrically. For this reason, the gap between the main body portion and the front face portion has to be wide enough not to mechanically or electrically degrade the flexible board, when the flexible board is bent. However, there is a need for making use of space in the vehicle, therefore leading to the demand for size reduction of the in-vehicle apparatus.

SUMMARY OF THE INVENTION

The present invention has been made in view of the above circumstances and provides an electronic apparatus, which size can be reduced without mechanical or electrical degradation of a flexible board.

According to one aspect of the present invention, there is provided an electronic apparatus to which a portable apparatus is attachable, the electronic apparatus including: a main body portion; a front face portion; and a flexible board connecting the main body portion and the front face portion, and the front face portion is arranged to be capable of being displaced with respect to the main body portion; and a recess portion is defined at the front face portion to be capable of partially accommodating a distorted portion of the flexible board to be distorted when the front face portion is displaced. Accordingly, even if the gap between the front face portion and the main body portion is made small, the electronic apparatus can be downsized without degrading the flexible board mechanically or electrically.

According to another aspect of the present invention, there is provided an electronic apparatus to which a portable apparatus is attachable, the electronic apparatus including: a front face portion having a front face and a rear face, the front face being capable of attaching the potable apparatus at the front face of the front face portion; a main body portion having a front face; and a flexible board connecting the main body portion and the front face portion, and the main body portion and the front face portion are arranged to be capable of being displaced in a state where the front face of the main body portion opposes to a rear face of the front face portion and in a state where the front face portion is tilted toward the main body portion; and a recess portion for accommodating the flexible board is defined at the rear face of the front face portion in a state where the rear face of the front face portion opposes to the front face of the main body portion. Accordingly, even if the gap between the front face portion and the main body portion is made small, the electronic apparatus can be downsized without degrading the flexible board mechanically or electrically.

BRIEF DESCRIPTION OF THE DRAWINGS

Exemplary embodiments of the present invention will be described in detail with reference to the following drawings, wherein.

DESCRIPTION OF THE PREFERRED EMBODIMENTS

A description will now be given, with reference to the accompanying drawings, of exemplary embodiments of the present invention.

Exemplary Embodiment

Figure 1A:
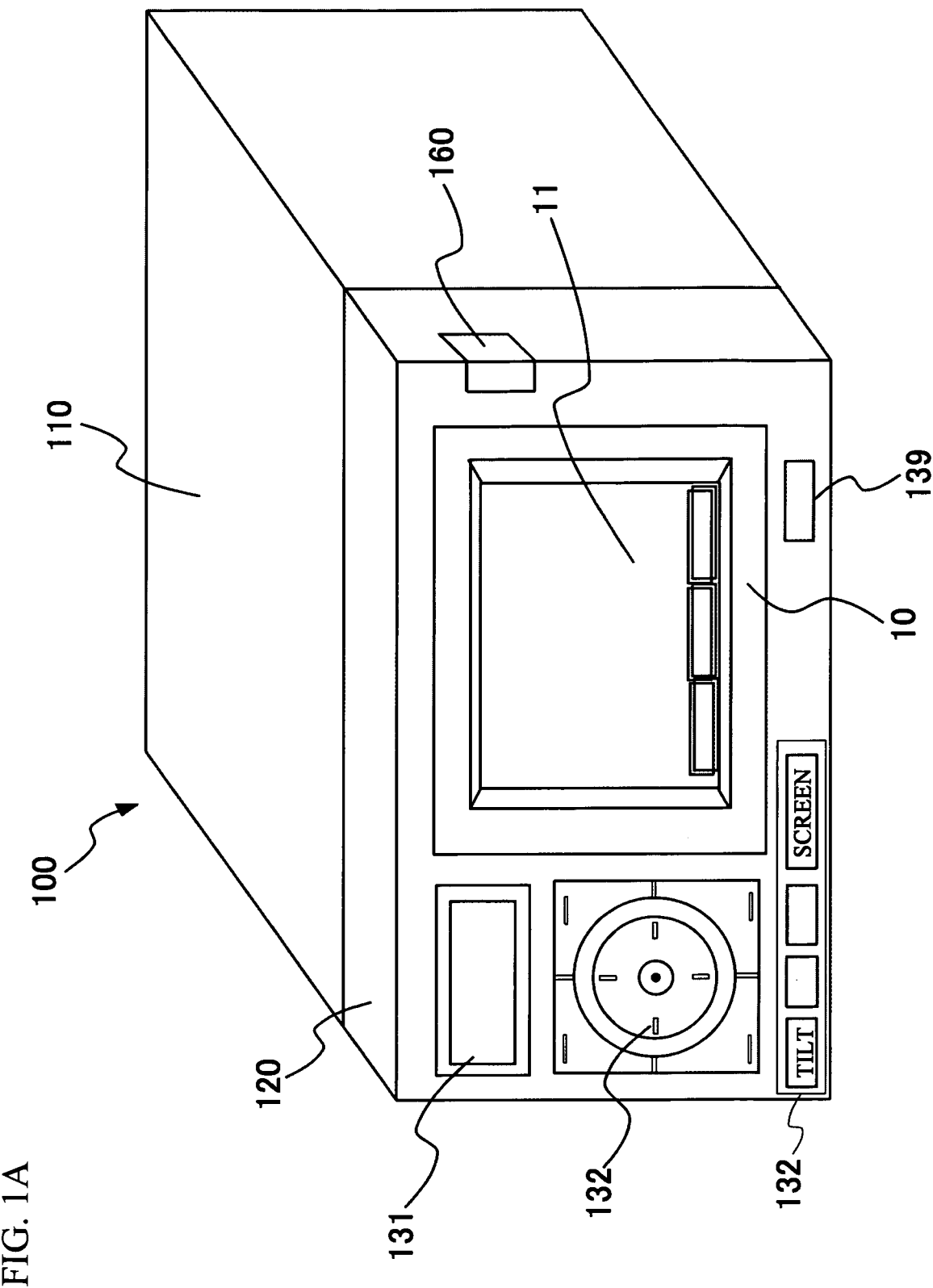
FIG. 1A and FIG. 1B show exterior views of an in-vehicle system employed in an exemplary embodiment of the present invention.
Figure 1B:
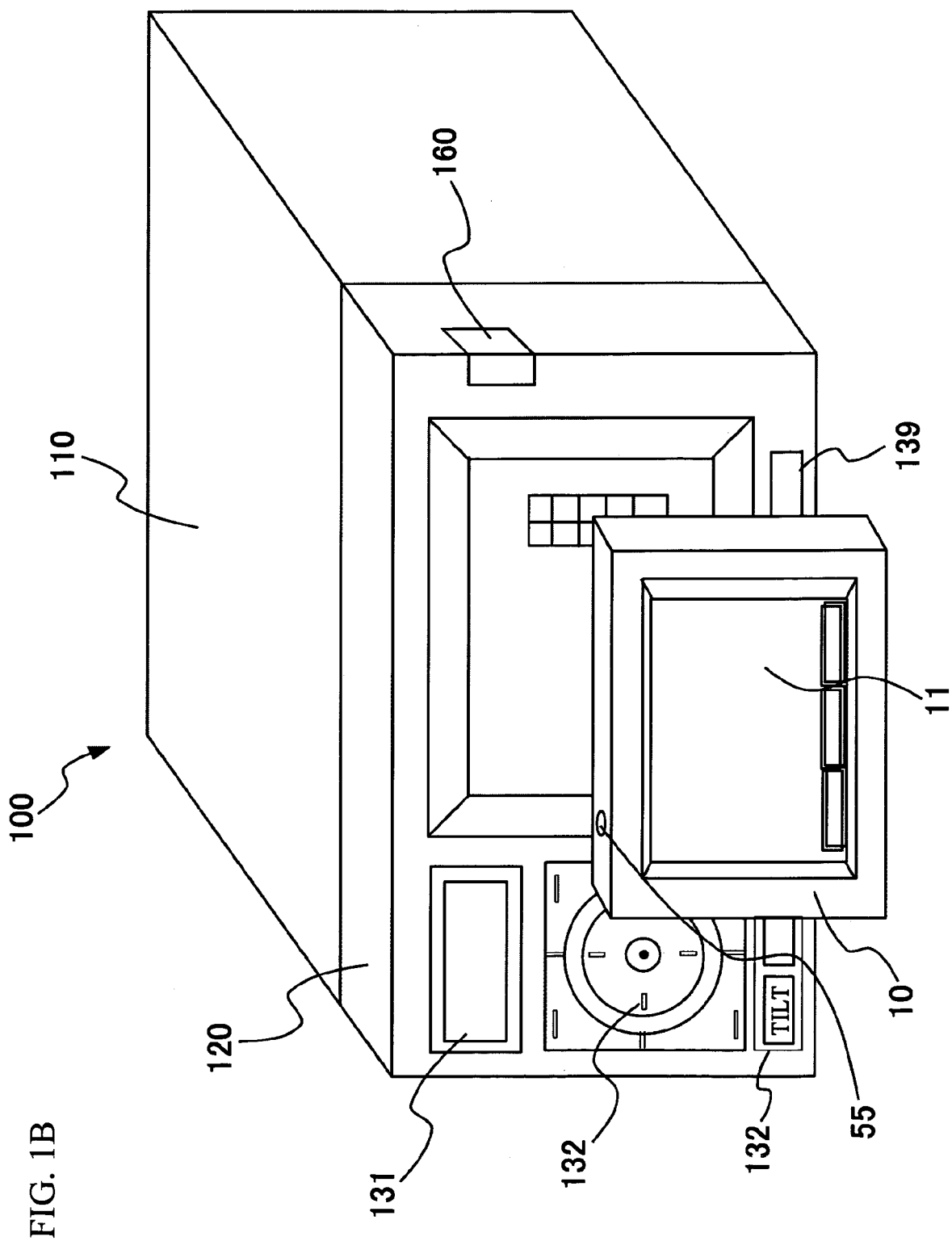

FIG. 1A and FIG. 1B show exterior views of an in-vehicle system 1. As shown in FIG. 1A and FIG. 1B, the in-vehicle system 1 is composed of: an in-vehicle apparatus 100 (in-vehicle electronic apparatus); and a portable apparatus 10 (portable apparatus) with navigation capabilities. The portable apparatus 10 can be used after being attached at a front face portion 120 of the in-vehicle apparatus 100, as shown in FIG. 1A, and can be also used after being detached from the in-vehicle apparatus 100, as shown in FIG. 1B. In this manner, the portable apparatus 10 is detachable from the in-vehicle apparatus 100, and the portable apparatus 10 is attachable to the in-vehicle apparatus 100.

The in-vehicle apparatus 100 is capable of playing radio broadcasting or playing music data recorded on a memory medium such as a CD (Compact Disc) or the like, and the in-vehicle apparatus 100 includes: an in-vehicle apparatus main body portion 110 having a CD player and a CD insertion/ejection slot; and the front face portion 120 having a display portion 131 and an operating portion (main operating portion) 132.

The portable apparatus 10 has navigation capabilities of searching for a guiding path to a destination and displaying the searched guiding path over a map.

Figure 2:
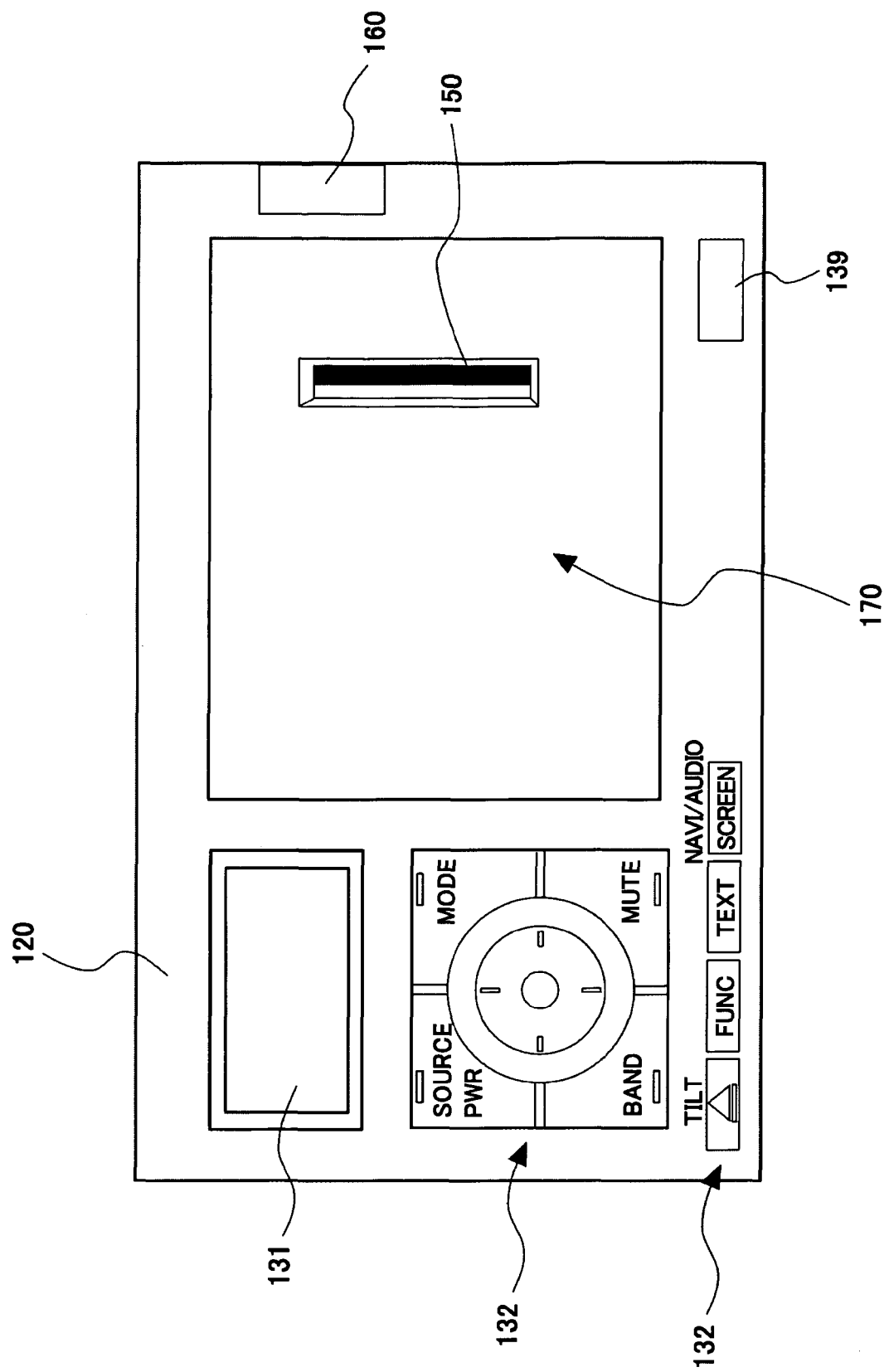
FIG. 2 shows a front face portion of the in-vehicle apparatus, from which the portable apparatus is removed.

FIG. 2 shows the front face portion 120 of the in-vehicle apparatus 100, from which the portable apparatus 10 is removed. There is provided an attached/detached portion 170 in which a recess portion is defined for attaching the portable apparatus 10, at the front face portion 120 of the in-vehicle apparatus 100. The attached/detached portion 170 is provided with: a connector 150 (housing portion side connector) for electrically coupling the in-vehicle apparatus 100 and the portable apparatus 10; and a lock mechanism (not shown) for securing the portable apparatus 10 to the front face portion 120. When a detach button 160 provided at the front face portion 120 is operated, a lock mechanism, not shown, is unlocked and the portable apparatus 10 is detachable from the in-vehicle apparatus 100.

Figure 3:
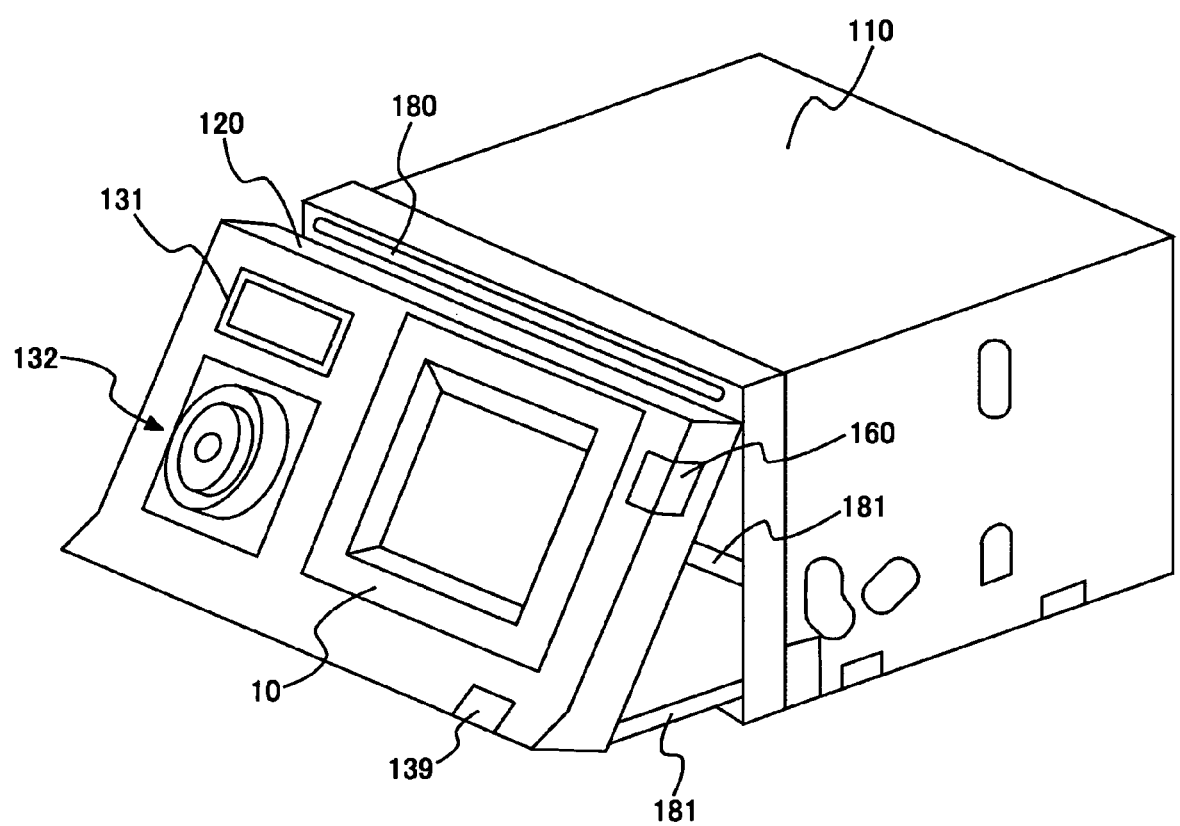
FIG. 3 is a view showing a state of tilting the front face portion against the main body of the in-vehicle apparatus to expose a CD insertion/ejection slot.

FIG. 3 shows a state of tilting the front face portion 120 against the in-vehicle apparatus main body portion 110 to expose a CD insertion/ejection slot 180.

By driving a slider 181 shown in FIG. 3 with a drive mechanism, not shown, the front face portion 120 can be tilted against the in-vehicle apparatus main body portion 110. By tilting operation, the CD insertion/ejection slot 180 provided in the in-vehicle apparatus main body portion 110 is exposed, so a CD can be inserted or ejected. There is provided an operation button (a tilt/eject button 132a shown in FIG. 6), at the front face portion 120 of the in-vehicle apparatus 100, and a tilt angle can be set according to the operation of the button.

Figure 4:
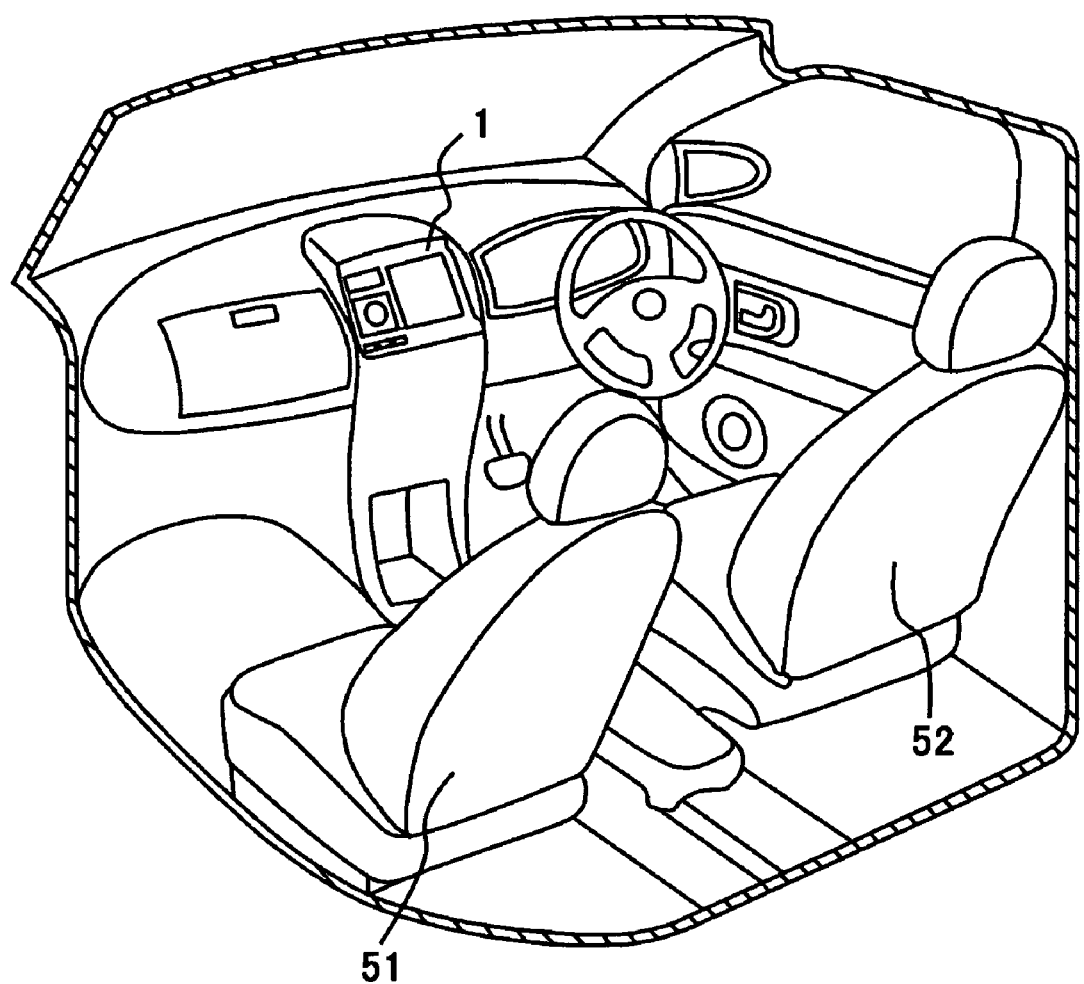
FIG. 4 shows a state of mounting the in-vehicle system in a vehicle.

FIG. 4 illustrates an example of mounting the in-vehicle system 1 in a vehicle.

The in-vehicle system 1 is disposed in a dashboard portion substantially in the middle of a front-passenger's seat 51 and a driver's seat 52, as shown in FIG. 4, for example.

Here, a GPS (Global Positioning System) antenna, not shown, of a GPS information receiver 133 is located on the dashboard or attached at an inner side of a front glass.

Figure 5:
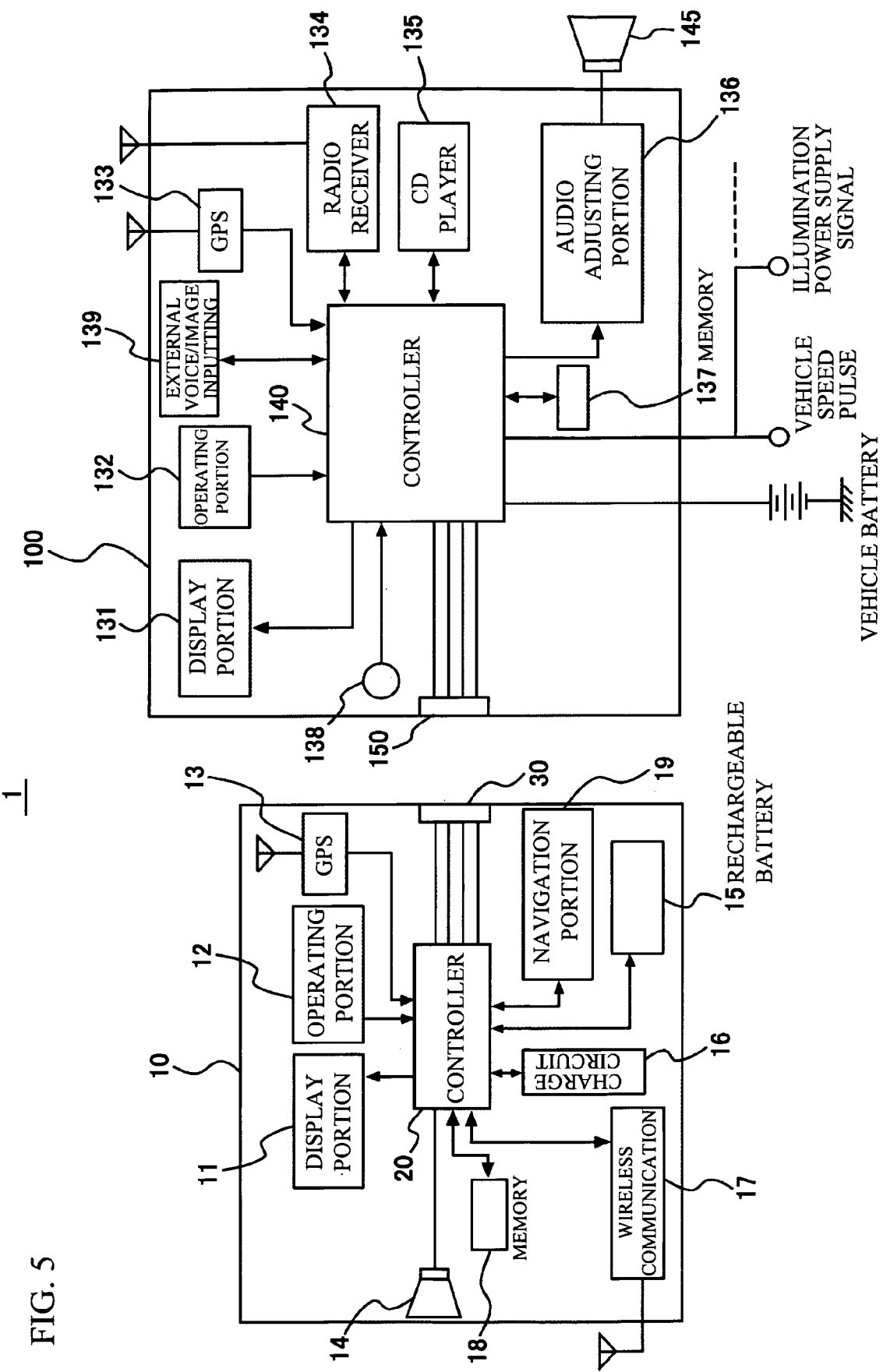
FIG. 5 is a block diagram showing a schematic configuration of the in-vehicle system.

FIG. 5 is a block diagram showing a schematic configuration of the in-vehicle system 1.

The in-vehicle apparatus 100 and the portable apparatus 10 are electrically connected by connectors. The connector 150 is provided at the in-vehicle apparatus 100 side, and a connector 30 (portable apparatus side connector) is provided at the portable apparatus 10. By connecting the connectors 150 and 30, various signals are sent and received between the in-vehicle apparatus 100 and the portable apparatus 10 to function as the in-vehicle system 1. The connectors 150 and 30 are respectively provided with power supply terminals for supplying power to the portable apparatus 10 from the battery of the vehicle. When the portable apparatus 10 is connected to the in-vehicle apparatus 100 and the power is supplied to the in-vehicle apparatus 100, the power is also supplied to the portable apparatus 10 via the power supply terminals.

The in-vehicle apparatus 100 is provided with: the display portion 131; the operating portion 132; the GPS information receiver 133; a radio receiver 134; a CD player 135; an audio adjusting portion 136; a memory 137; a microphone 138; an external voice/image inputting portion 139; a controller 140; and the connector 150. The in-vehicle apparatus 100 is activated by supplying the power from the battery of the vehicle, when the engine key is positioned at Acc or IG.

Hereinafter, the function of each part will be described in detail.

The display portion 131 is provided with a liquid crystal panel and a backlight, and displays a frequency of the received broadcasting, a track number of music being played, a music name being played, and the like, according to the 13-segment display.

Figure 6:
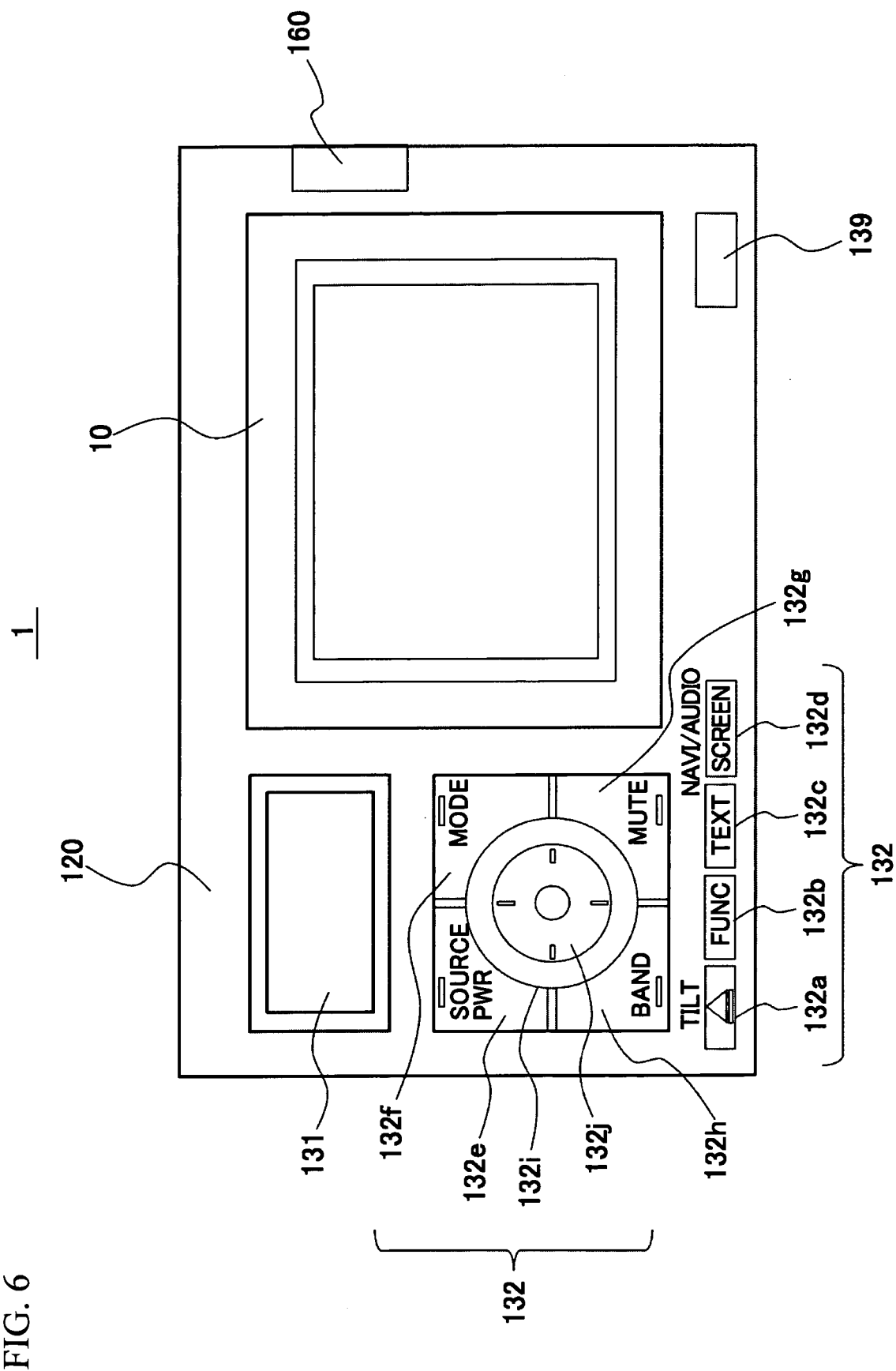
FIG. 6 is a front view of a main body.

The operating portion 132 is provided for selectively changing the operation mode of the in-vehicle apparatus 100, and for operating in various modes that have been changed. The operating portion 132 is provided with a group of buttons including: the tilt/eject button 132a; a function (represented as FUNC in the drawing)/AF button 132b; a TEXT button 132c; a SCREEN button 132d; a SOURCE/PWR button 132e; a MODE button 132f; a MUTE button 132g; a BAND change button 132h; a rotary button 132i; a cross key/enter key button 132j, as shown in FIG. 6.

Here, a description will be given of switching the display between the portable apparatus 10 and the in-vehicle apparatus 100.

Firstly, the in-vehicle apparatus 100 turns on when the SOURCE/POWER button 132e of the in-vehicle apparatus 100 is pushed. When the SOURCE/POWER button 132e is pushed for a short period of time while the portable apparatus 10 is on, the source is changed to the CD playing or radio broadcasting. At this time, the information on the selected source is displayed on the display portion 131 of the in-vehicle apparatus 100, and the navigation image is displayed on a display portion 11 of the portable apparatus 10, without relation to the source.

Next, when the SCREEN button 132d is pushed, the navigation image displayed on the display portion 11 of the portable apparatus 10 can be changed to an image corresponding to the source selected at the in-vehicle apparatus 100.

Figure 7A:
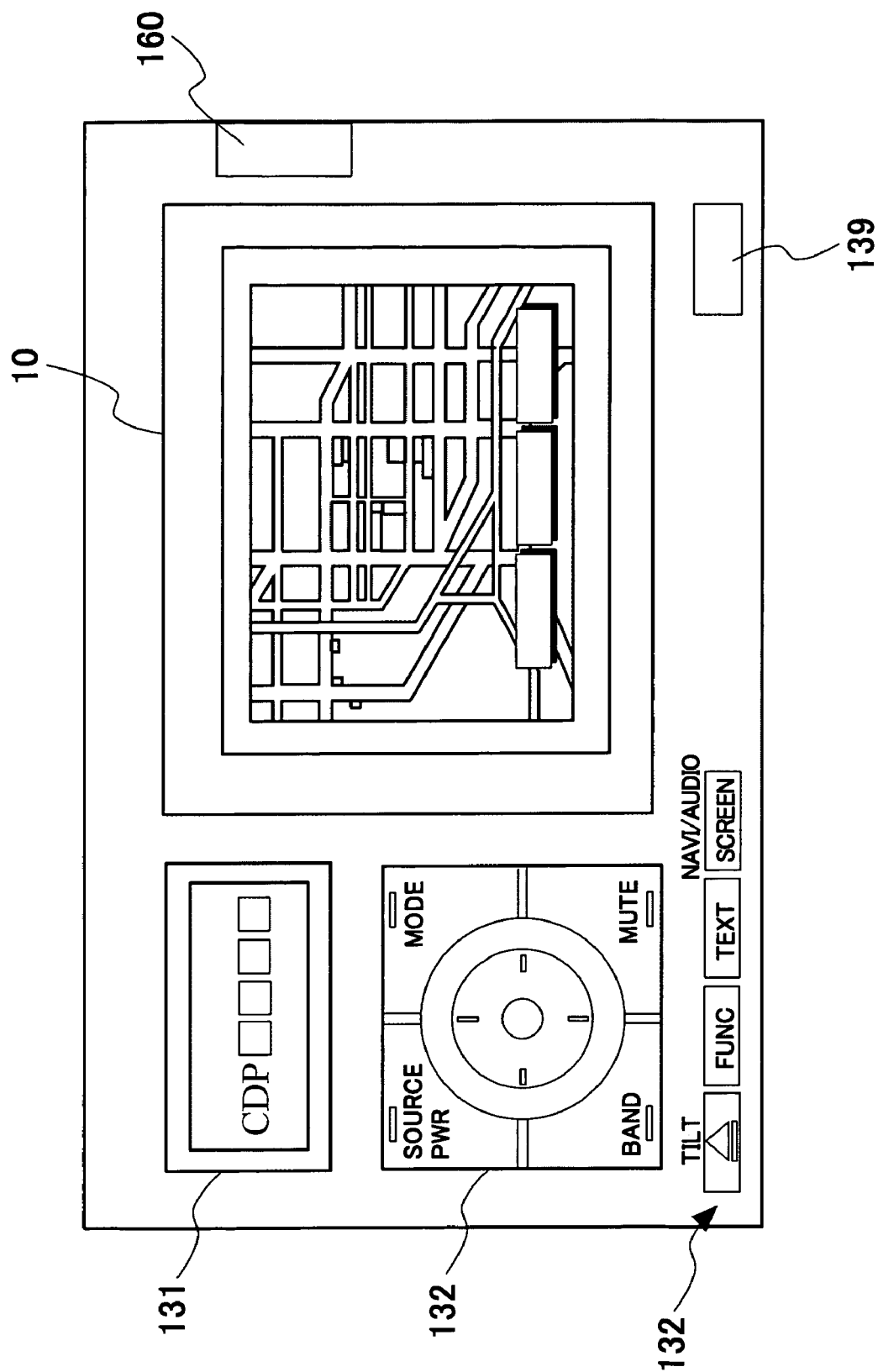
FIG. 7A through FIG. 7C show display examples of the portable apparatus attached to the main body.

FIG. 7A shows a state where the portable apparatus 10 is attached to the in-vehicle apparatus 100 while the CD is being played and a navigation image is being displayed on the portable apparatus 10.

Figure 7B:
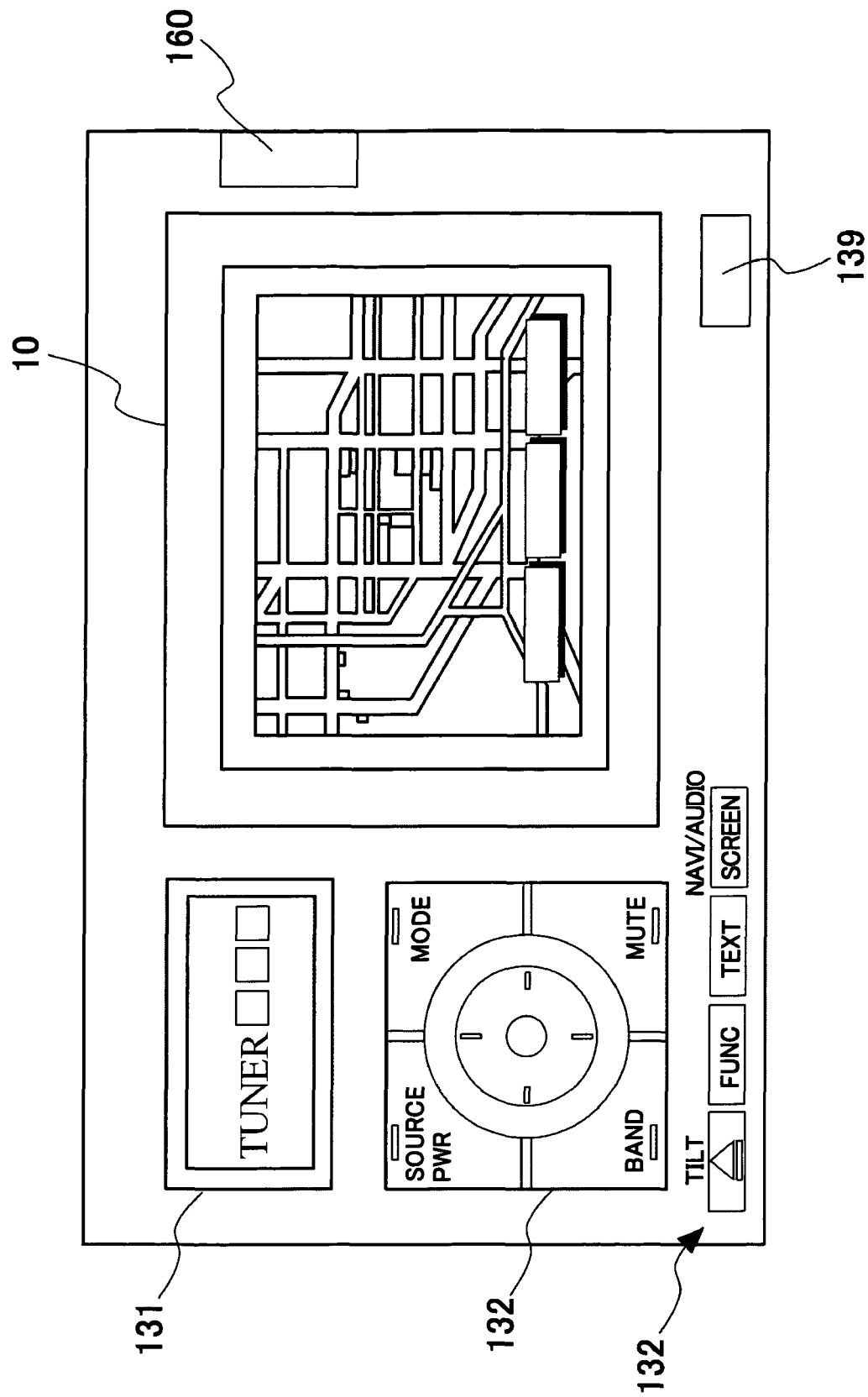

When the SOURCE/POWER button 132e is pushed in the state of FIG. 7A and the source is changed from the CD playing to the radio broadcasting, the information on the radio source is displayed on the display portion 131, as shown in FIG. 7B. Also, the navigation image remains being displayed on the display portion 11 of the portable apparatus 10.

Figure 7C:
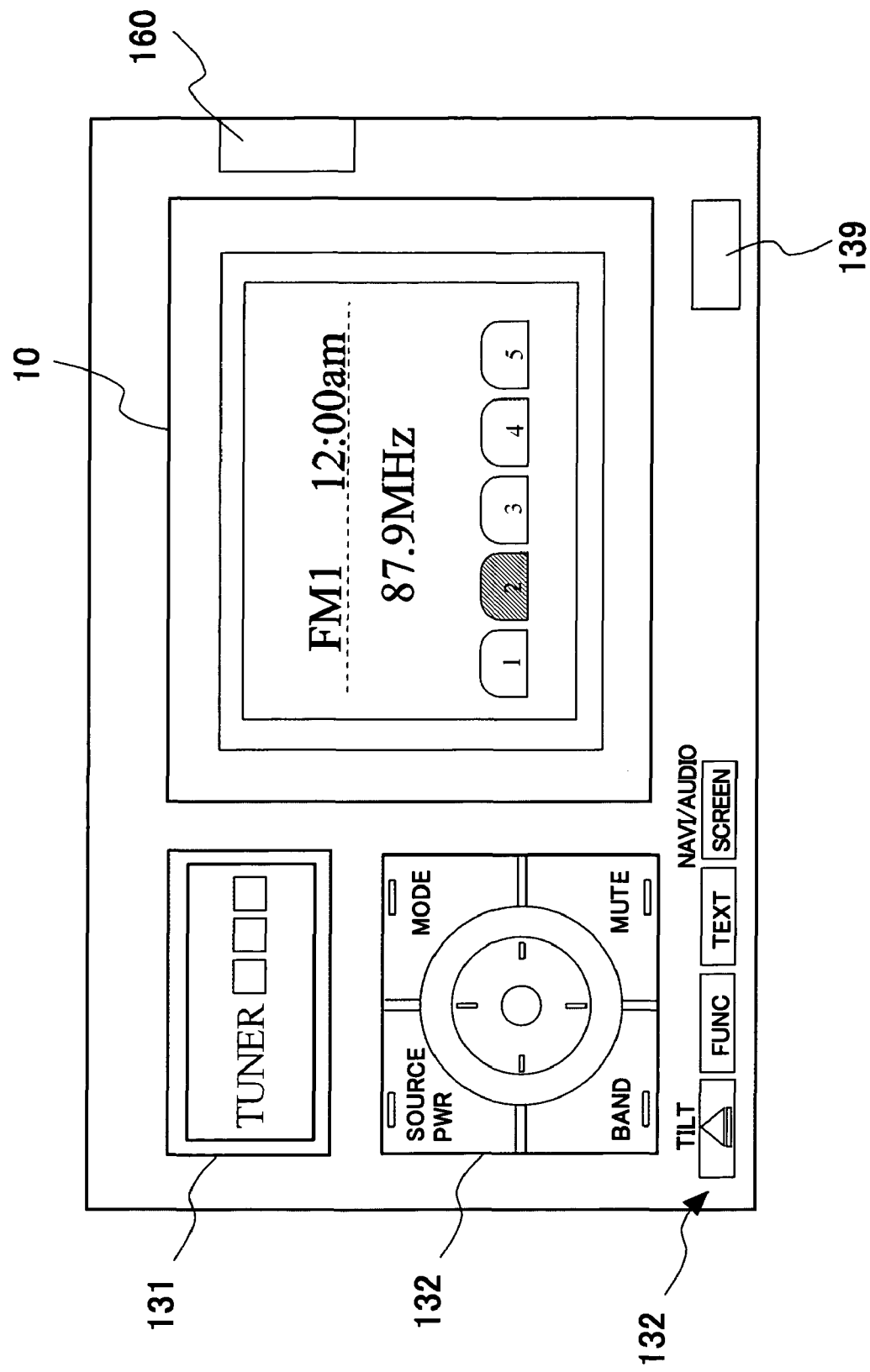

Then, when a user pushes the SCREEN button 132d, the image corresponding to the source being processed by the in-vehicle apparatus 100 is displayed on the display portion 11 of the portable apparatus 10, as shown in FIG. 7C (radio image is displayed in FIG. 7C). A touch panel, described later, is provided in the display portion 11 of the portable apparatus 10. A user is capable of operating the source currently being processed, by selecting the operation buttons displayed on the display portion 11.

In addition, when the SCREEN button 132d is pushed with the radio screen being displayed on the display portion 11, it is possible to return to the navigation image from the radio image, as shown in FIG. 7B. When the portable apparatus 10 is removed from the in-vehicle apparatus 100, the operation of the SCREEN button 132d is invalid.

Furthermore, when a USB (Universal Serial Bus) or the like is connected to the external voice/image inputting portion 139 with the portable apparatus 10 removed from the in-vehicle apparatus 100, it is possible to prevent the change to the USB source, even if the SOURCE/POWER button 132e is pushed.

Referring back to FIG. 5, the GPS information receiver 133 includes a GPS antenna and a tuner, and receives GPS signals from a satellite. The GPS signal received by the GPS information receiver 133 is output through the controller 140, the connector 150, the connector 30, and a controller 20, to a navigation portion 19 of the portable apparatus 10, and then the position of the vehicle in which the in-vehicle apparatus 100 having the portable apparatus 10 therein is determined based on the GPS signal.

Herein, the GPS signal may be output to the navigation portion of the portable apparatus 10 through the controller 140, instead of through the controller 20. Alternatively, the GPS information receiver 133 may be composed of the GPS antenna only, so that the GPS signal received by the GPS antenna may be output to the tuner of a GPS information receiver 13, described later, without through the controller 140 or the controller 20. Further alternatively, the GPS signal received by a GPS antenna may be output through the controller 20 to the tuner of the GPS information receiver 13 without through the controller 140. Various changes may be made as necessary.

The radio receiver 134 has an antenna and a tuner, receives broadcast waves such as AM broadcasting, FM broadcasting, and sound multiplex broadcasting, outputs stereo audio signals, receives and demodulates multiplex data, and outputs the demodulated signal to the controller 140.

The CD player 135 reproduces the data stored in the CD, and outputs the reproduced signal to the controller 140.

Herein, the demodulated signal output from the radio receiver 134 may be output to the audio adjusting portion 136, described later, without through the controller 140.

The audio adjusting portion 136 implements signal processing such as volume control or tone control on an audio signal received or demodulated by the radio receiver 134 or the audio signal reproduced by the CD player 135, and then outputs the processed signal to a speaker 145.

The memory 137 may be composed of a RAM (Random Access Memory) from which data is readable and into which data is writable, and temporarily stores information necessary for control.

The microphone 138 is provided for hands-free communication, and takes in user's voices in the vehicle.

The external voice/image inputting portion 139 is provided with a connection terminal with an external device such as a USB memory, portable audio device, or the like so that an audio signal or data from the external device may be input. The external voice/image inputting portion 139 then sends the signal or data to the controller 140, and outputs the audio signal, data, or the like to the external device connected.

The controller 140 controls the radio receiver 134, the CD player 135, and the audio adjusting portion 136, according to the operation by means of the operating portion 132.

Also, the controller 140 outputs various signals through the connector 150 to the portable apparatus 10, and controls the in-vehicle apparatus 100 on the basis of the various signals input from the portable apparatus 10. For example, the controller 140 outputs the GPS signal received by the GPS information receiver 133 or the audio signal input through the microphone 138, to the portable apparatus 10 by way of the connector 150.

Here, the audio signal input through the microphone 138 may be output to the portable apparatus 10 by way of the connector 150, without through the controller 140.

In addition, the voice on communication over a mobile phone connected to the portable apparatus 10 is input through the connector 150 into the controller 140, and is then output through the audio adjusting portion 136 to the speaker 145.

Furthermore, the controller 140 acquires an operation signal corresponding to a menu image of various modes displayed on the display portion 11 of the portable apparatus 10, from the controller 20 of the portable apparatus 10, and then controls the radio receiver 134 and the CD player 135.

Also, the power is supplied to the controller 140 from the battery mounted in the vehicle. When the portable apparatus 10 is connected, the controller 140 outputs the power supplied from the battery to the portable apparatus 10.

Here, a vehicle speed pulse and an illumination power supply signal are input into the controller 140 from a vehicle. The controller 140 transfers such input vehicle speed pulse to the controller 20 of the portable apparatus 10. Meanwhile, the vehicle speed pulse may be configured not to be input into the in-vehicle apparatus 100.

Next, a description will be given of the portable apparatus 10. The portable apparatus 10 is provided with: the display portion 11; an operating portion 12; the GPS information receiver 13; a speaker 14; a rechargeable battery 15; a charge circuit 16; a wireless communication transmitter/receiver 17; a memory 18; the navigation portion 19; the controller 20; and the connector 30.

Hereinafter, functions of the components will be described in detail.

The display portion 11 is provided with a liquid crystal panel and a backlight, and is capable of displaying map information generated by the navigation portion 19 and guiding path information to a destination, the received broadcasting frequency transferred from the in-vehicle apparatus 100, a music track number played, music name played, and the like.

Here, the display portions 11 and 131 may employ a flat panel display other than a liquid crystal panel. Examples are organic light emitting display, plasma display panel, cold-cathode flat panel display, or the like.

The operating portion 12 includes a power button 55 (see FIG. 8A) for powering on or off the touch panel or the portable apparatus 10. The touch panel is, for example, disposed on the display screen. When the touch panel is touched by a finger or a dedicated pen, the touched position is detected to determine whether or not there is an input operation. The power button 55 will be described later in detail.

The GPS information receiver 13 includes an antenna and a tuner, and receives the GPS signal from a satellite. Such received GPS signal is output to the navigation portion 19, and the vehicle location is detected based on the GPS signal. Meanwhile, the in-vehicle apparatus 100 is also provided with the GPS information receiver 133. However, when the portable apparatus 10 is attached to the in-vehicle apparatus 100, the location of the vehicle, in which the in-vehicle apparatus 100 having the portable apparatus 10 is mounted, is specified by use of the GPS signal (and the vehicle speed pulse) received by the GPS information receiver 133. When the portable apparatus 10 is used alone, the location thereof is specified by use of the GPS signal received by the GPS information receiver 13.

The speaker 14 is provided for outputting the audio information of the navigation portion 19, and outputs the audio information only when the portable apparatus 10 is detached from the in-vehicle apparatus 100, namely, used alone separately.

The rechargeable battery 15 supplies power to each portion of the portable apparatus 10, when the portable apparatus 10 is detached from the in-vehicle apparatus 100. When the portable apparatus 10 is attached to the in-vehicle apparatus 100, the power is supplied through the power supply terminals of the connector 30 from the battery of the vehicle and the rechargeable battery 15 is charged by the charge circuit 16. Also, the charge circuit 16 is supplied with the power from the connection terminal through a USB slot 57 (see FIG. 8A), and the rechargeable battery 15 can be charged.

The wireless communication transmitter/receiver 17 sends and receives the voice on communication over a mobile phone, and acquires the information used for navigation over the mobile phone. For example, Bluetooth, which is a wireless transmission system at 2.4 GHz band, is used for the wireless communication transmitter/receiver 17.

The memory 18 may be a RAM from which data is readable and into which the data is writable, and temporarily stores the information read for each control.

The navigation portion 19 includes a map information storing portion that acquires from an SD (Secure Digital) card or a USB memory, described later, and stores the map information used for navigation, determines current location information with GPS signal from the GPS information receiver 133 or the GPS information receiver 13, and creates a map image for navigation. The created map image may be displayed on the display portion 11. In addition, when the in-vehicle apparatus 100 and the portable apparatus 10 are connected, the vehicle speed pulse is acquired from the vehicle so that the accuracy at the location detection of the vehicle can be improved. Optionally, the map information may be retained in the portable apparatus 10.

The controller 20 controls each part of the portable apparatus 10. Also, the controller 20 outputs various signals to the in-vehicle apparatus 100 through the connector 30, and controls the portable apparatus 10 based on the various signals input from the in-vehicle apparatus 100. For example, the controller 20 acquires the GPS signal received by the GPS information receiver 133 of the in-vehicle apparatus 100 and the vehicle speed pulse, and outputs to the navigation portion 19. Also, the controller 20 acquires the audio signal input by the microphone 138 of the in-vehicle apparatus 100 from the controller 140 of the in-vehicle apparatus 100, and controls the navigation portion 19 according to the audio signal acquired. That is to say, the navigation portion 19 can be operated in a hands-free manner. The voice on communication over the mobile phone connected to the wireless communication transmitter/receiver 17 is output to an in-vehicle apparatus side through the connector 30, and is caused to output from the speaker 145 of the in-vehicle apparatus 100. The operation signal on the menu screen or content screen displayed on the display portion 11 is output to the controller 140 of the in-vehicle apparatus 100 through the connector 30. The controller 140 controls the radio receiver 134 or the CD player 135 according to the operation signal transmitted from the controller 20 of the portable apparatus 10.

Figure 8A:
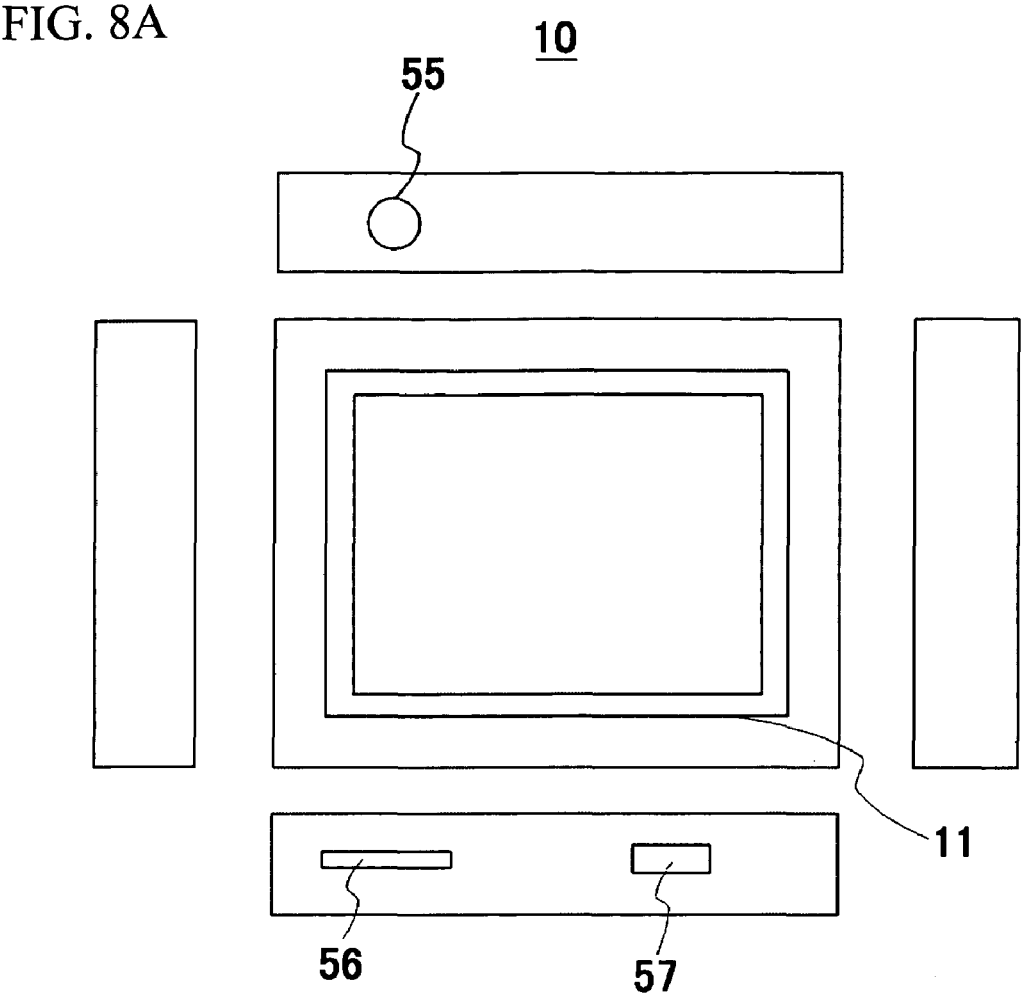
FIG. 8A shows a front view, top view, bottom view, left-side view, and right-side view of the portable apparatus.
Figure 8B:
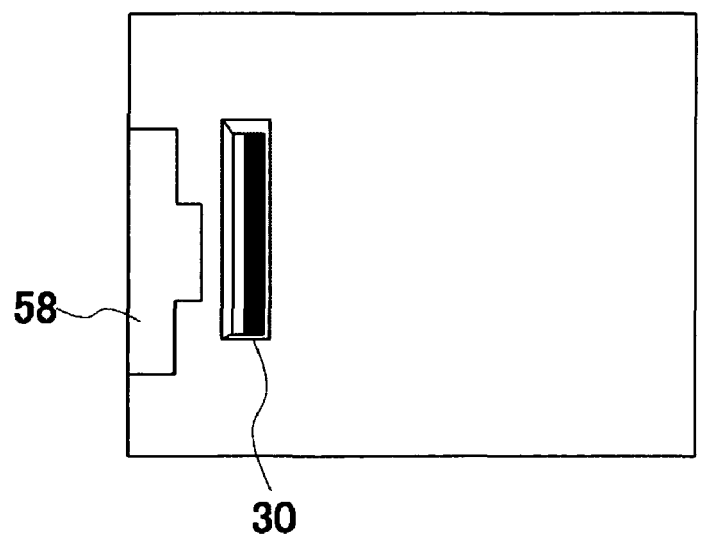
FIG. 8B is a back view of the portable apparatus.

FIG. 8A shows a front view, top view, bottom view, left-side view, and right-side view of the portable apparatus 10. FIG. 8B is a back view of the portable apparatus 10.

The top face of the portable apparatus 10 is provided with the power button 55 for turning on or off the power of the portable apparatus. The bottom face of the portable apparatus 10 is provided with: an SD memory card slot 56; and the USB slot 57. By inserting the SD card or the USB memory storing the map information into the slots, the controller 20 reads the map information from the SD card or the USB memory and outputs the map information to the navigation portion 19.

The power of the portable apparatus 10 is turned on or off by the control of the in-vehicle apparatus 100, when the portable apparatus is attached to the in-vehicle apparatus 100. In addition, when the portable apparatus 10 is removed from the in-vehicle apparatus 100 and used alone, the power is operated on the basis of the on and off operations of the power button 55.

At a backside of the portable apparatus 10, there are provided: the connector 30 electrically connected with the in-vehicle apparatus 100; and an engagement portion 58 to be engaged with a lock mechanism (not shown) provided at the in-vehicle apparatus 100 side.

Figure 9:
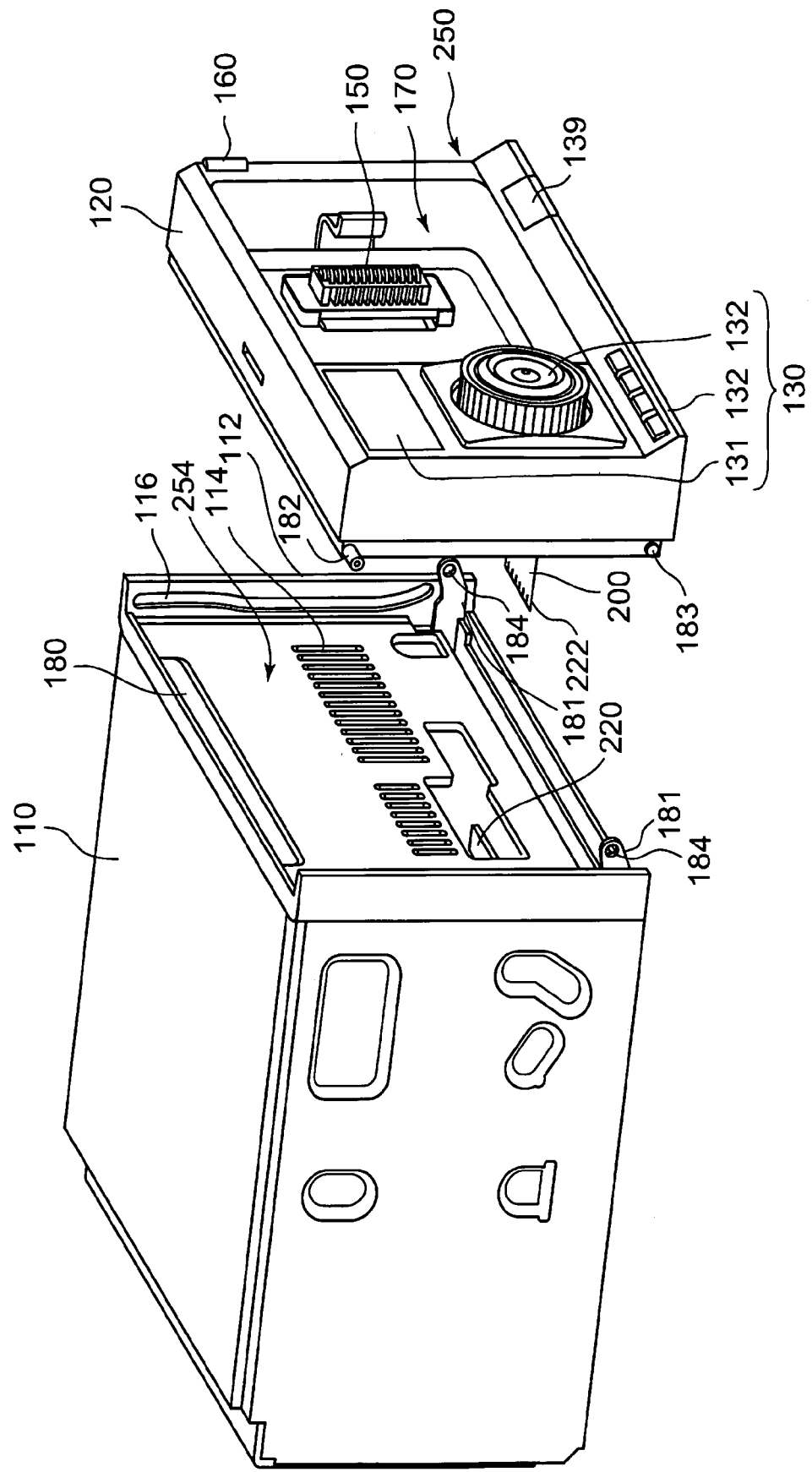
FIG. 9 is a detail view showing the front face portion and the main body portion separated.

FIG. 9 is a view showing the front face portion and the main body portion separated. A CD insertion/ejection slot 180; air openings 114; and a connector 220 are defined at a front face 254 of the main body portion 110. Covers 112 covering the front face portion 120 are provided at both sides of the front face 254 of the main body portion 110, and guide grooves 116 guiding the movement of the front face portion 120 are defined at the inner side faces of the covers 112. In addition, the slider 181 supporting the movement of the front face portion 120 at a lower portion of the front face 254 of the main body portion 110, by sliding back and forth. There are provided at a front face 250 of the front face portion 120: the attached/detached portion 170 accommodating the portable apparatus 10; and a front face operating portion 130 having the display portion 131 and the operating portion 132.

Projections 182 and 183 are provided at the top and the bottom of the side faces of the front face portion 120. The projections 182 are engaged with the guide grooves 116, and the projections 183 are engaged with openings 184 provided at the slider 181, respectively. The front face portion 120 is tilted when the slider 181 is slid forward and the projections 182 slide the guide grooves 116 downward. This exposes the CD insertion/ejection slot 180.

A flexible board 200 protrudes at the rear face of the front face portion 120. Contact pins 222 are provided at an end of the flexible board 200. The contact pins 222 are inserted into the connector 220 provided at the front face 254 of the main body portion 110. This electrically connects the front face portion 120 and the main body portion 110.

Figure 10:
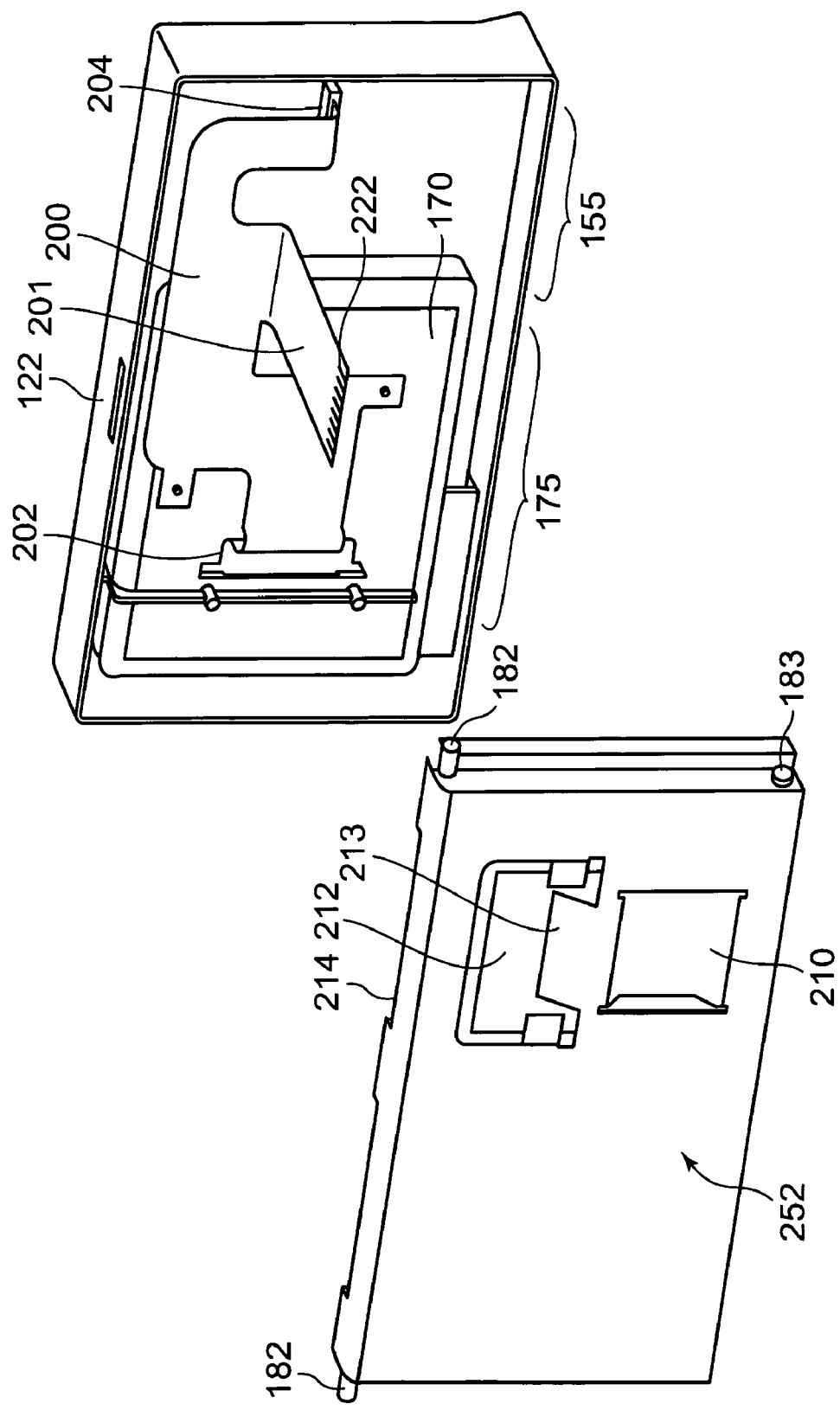
FIG. 10 is a detail view showing a front face chassis of the front face portion and a rear face chassis thereof separated.

The front face portion 120 is composed of: a front face chassis 122; and a rear face chassis 124, and FIG. 10 is a view showing the front face chassis 122 of the front face portion 120 and the rear face chassis 124 thereof separated. The region for the attached/detached portion 170 in the front face chassis 122 corresponds to an attached/detached region 175, and the region for the front face operating portion 130 corresponds to an operating portion region 155. The front face chassis 122 has the flexible board 200. The flexible board 200 is in connection with the connector 150 to be connected to the portable apparatus 10, at a connecting portion 202. Also, the flexible board 200 is in connection with the front face operating portion 130, at a connecting portion 204. Further, the flexible board 200 has the contact pins 222 to be connected to the main body portion 110. In this manner, by connecting the flexible board 200 with the connecting portions 202 and 204 respectively and with the connector 220, the portable apparatus 10, the front face operating portion 130, and the main body portion 110 are electrically coupled.

A through hole 212, through which an end 201 of the flexible board 200 (having the contact pins 222) pierces, is defined at the rear face chassis 124. A guide plate 213 is provided below the through hole 212 so as to guide the flexible board 200 to a lower portion of a rear face 252. Also, a recess portion 210 is defined below the through hole 212 of the rear face 252 of the rear face chassis 124 (of the front face portion 120).

Figure 11:
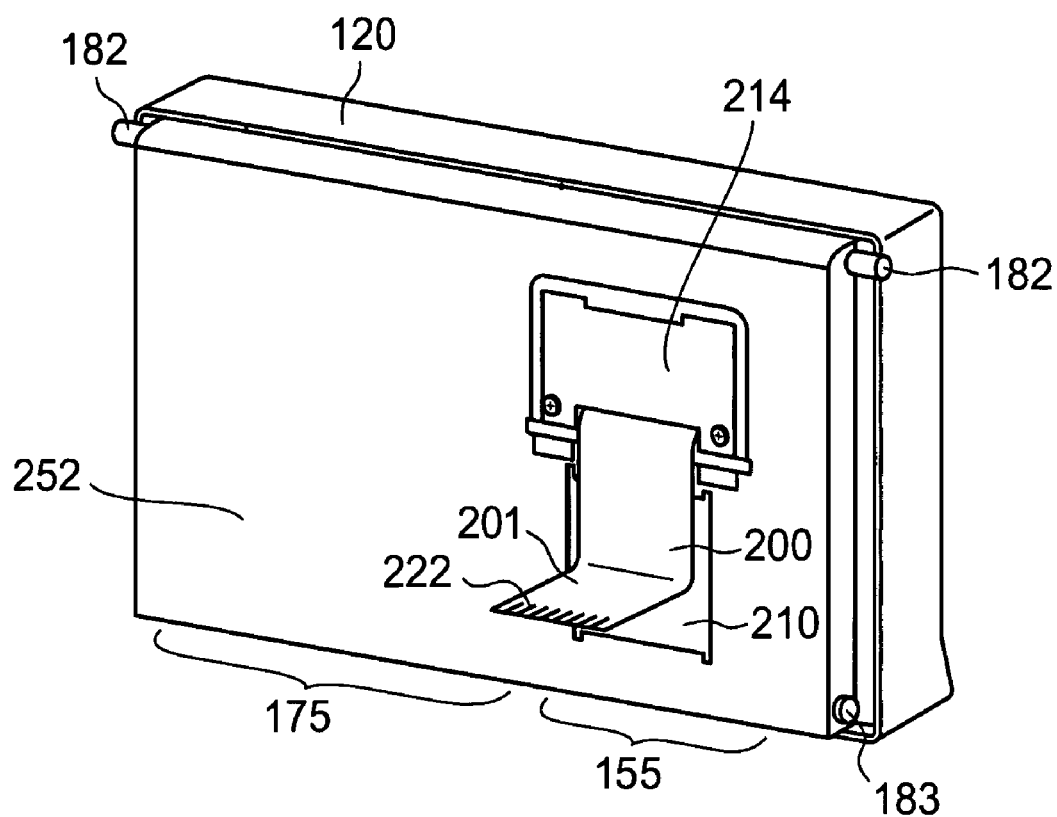
FIG. 11 is a detail view of the front face portion in which the front face chassis and the rear face chassis are fitted and integrated.

FIG. 11 is a view of the front face portion in which the front face chassis 122 and the rear face chassis 124 are fitted and integrated. The end 201 of the flexible board 200 is drawn from the rear face 252 of the front face portion 120. The through hole through which the end 201 of the flexible board 200 is drawn is covered with a cover 214. The flexible board is interposed between the cover 214 and the guide plate 213 shown in FIG. 10, and is drawn downward of the rear face 252. The recess portion 210 is so arranged to accommodate the flexible board 200. That is to say, the recess portion 210 has a width greater than that of the end 201 of the flexible board 200. The recess portion 210 is provided at the operating portion region 155.

Figure 12A:
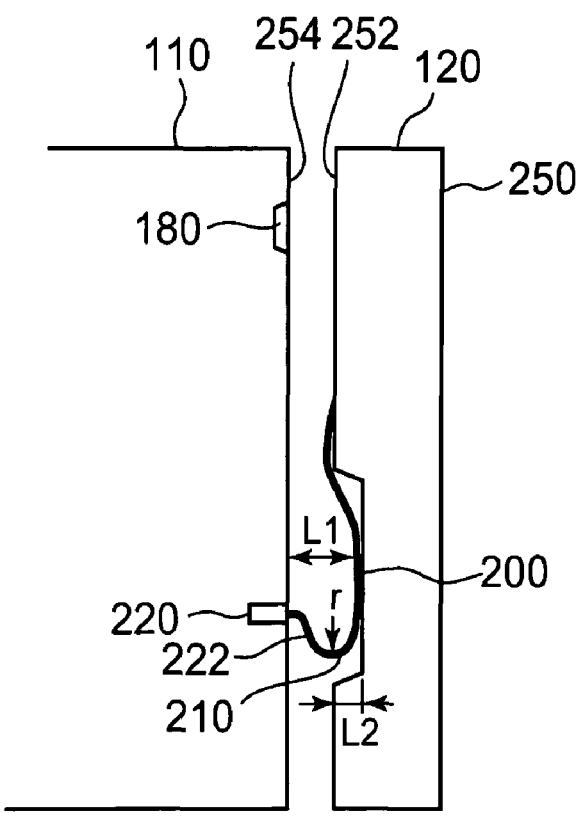
FIG. 12A and FIG. 12B schematically show the main body portion and the front face portion connected by a flexible board with the front face portion displaced.
Figure 12B:
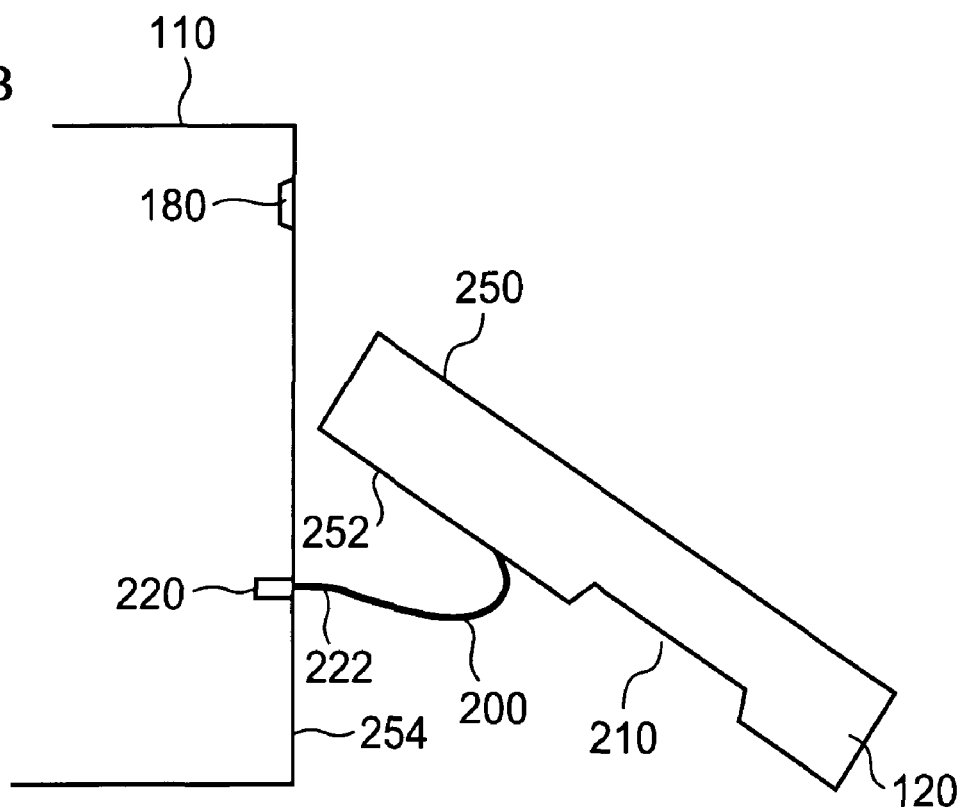

FIG. 12A and FIG. 12B are schematic views explaining a state where the main body portion 110 and the front face portion 120 are connected by the flexible board 200 and the front face portion 120 is displaced. As shown in FIG. 12A and FIG. 12B, the contact pins 222 of the flexible board 200 are inserted into the connector 220 of the main body portion 110. Referring to FIG. 12A, the flexible board 200 is bent to be accommodated in the recess portion 210, when the rear face 252 of the front face portion 120 covers the front face 254 of the main body portion 110. Also, referring to FIG. 12B, the portion of the flexible board 200 bent at the recess portion 210 is extended by displacing the front face portion 120 from a state of covering the front face 254 of the in-vehicle apparatus main body portion 110. In this manner, when the front face portion 120 is displaced from a state of covering the main body portion 110, the CD insertion/ejection slot (main body operating portion) 180 provided at the front face 254 of the main body portion 110 is exposed. This permits a CD to be inserted into or ejected from the CD insertion/ejection slot 180. In other words, the main body operating portion is operable.

When the flexible board 200 is bent, the flexible board 200 may be degraded mechanically or electrically depending on the bent level thereof. That is, the flexible board 200 may be broken and remain bent, or may be disconnected. Hence, in order not to mechanically or electrically degrade the flexible board 200, the flexible board 200 is to be bent to draw a curve greater than a given curvature radius. When r is set to a curvature radius by which the flexible board 200 is not degraded mechanically or electrically, a gap between the connector 220 (that is, the front face 254 of the main body portion 110) and a portion of the flexible board 200 arranged along the rear face 252 has to have a given distance L1 or more in order to bend the flexible board 200 with the curvature radius of r, as shown in FIG. 12A. Therefore, when the recess portion 210 is not defined at the rear face 252 of the front face portion 120, the gap between the front face 254 of the main body portion 110 and the rear face 252 of the front face portion 120 cannot be configured to L1 or less. That is to say, the gap between the front face 254 of the main body portion 110 and the rear face 252 of the front face portion 120 cannot be made small, thereby hindering size reduction of the in-vehicle apparatus.

In the present exemplary embodiment, as shown in FIG. 12A and FIG. 12B, the front face portion 120 is arranged such that the front face portion 120 can be displaced with respect to the main body portion 110, and the recess portion 210 is defined at the front face portion 120 so as to be capable of partially accommodating a distorted portion of the flexible board 200 when the front face portion 120 is displaced. The recess portion 210 has a shape dented from the rear face 252 of the front face portion 120 by a length L2. That is to say, the main body portion 110 and the front face portion 120 are arranged such that the front face 254 of the main body portion 110 opposes to the rear face 252 of the front face portion 120, as shown in FIG. 12A, and are arranged such that the front face portion 120 can be displaced to tilt against the main body portion 110, as shown in FIG. 12B. Then, as shown in FIG. 12A, the recess portion 210 accommodating the flexible board 200 is defined at the rear face 252 of the front face portion 120 in a state where the rear face 252 of the front face portion 120 opposes to the front face 254 of the main body portion 110.

This can cause the gap between the front face 254 of the main body portion 110 and the rear face 252 of the front face portion 120 to be narrower by a depth L2 of the recess portion 210. Accordingly, even if the flexible board 200 is bent with the curvature radius of r within a range in which the flexible board 200 is not mechanically or electrically degraded, the flexible board 200 can be accommodated in the recess portion 210. In other words, it is possible to accommodate a portion of the distorted portion of the flexible board 200 distorted when the front face portion 120 is displaced with respect to the main body portion 110. This allows the gap between the front face 254 of the main body portion 110 and the rear face 252 of the front face portion 120 to be narrower, thereby downsizing the in-vehicle electronic apparatus.

In the present exemplary embodiment, a description has been given of an example where the CD insertion/ejection slot 180 serves as the main body operating portion; however, the main body operating portion may be a button or the like for operating the insertion/ejection slot of a memory medium such as a memory card or the like or for operating the main body portion 110.

As shown in FIG. 12A, in the present exemplary embodiment, the flexible board 200 is connected to the front face 254 of the in-vehicle apparatus 100 such that the board face of the flexible board 200 is perpendicular to the front face 254. In such connection, the flexible board 200 extending from the connector 220 is firstly bent downward and then bent upward. Therefore, the recess portion 210 is particularly effective so as to cause the curvature radius of r to be a given value or more. Herein, the flexible board 200 is connected perpendicularly to the front face 254 of the main body portion 110. This is because the flexible board 200 can be inserted into the connector 220 with ease at the time of producing the in-vehicle apparatus 100. It is only necessary for the flexible board 200 to be connected to the connector 220. The configuration of the flexible board 200 is not limited to the perpendicular connection with the front face 254 of the main body portion 110, and may be connected in a substantially vertical direction of the front face 254.

Preferably, the recess portion 210 is defined at the rear face 252 of the front face portion 120, corresponding to the connector 220 of the main body portion 110 (a portion of the front face 254 with which the flexible board 200 is in connection) in a state where the rear face 252 of the front face portion 120 opposes to the front face 254 of the main body portion 110. This can accommodate the flexible board 200 in the recess portion 210 in a state where the rear face 252 of the front face portion 120 covers the front face 254 of the main body portion 110. Accordingly, the in-vehicle electronic apparatus can be downsized.

As shown in FIG. 12A, the flexible board 200 is drawn such that the board face of the flexible board 200 is substantially parallel to the rear face 252 of the front face portion 120. Also, the recess portion 210 is arranged below (in a direction where the flexible board 200 is in connection with the connector 220 of the main body portion 110) the portion where the flexible board 200 is drawn (the portion where the flexible board 200 is in connection with the rear face 252 of the front face portion 120). This makes it possible to accommodate the flexible board 200 in the recess portion 210 with ease, in a state where the rear face 252 of the front face portion 120 covers the front face 254 of the main body portion 110. Accordingly, the gap between the front face 254 of the main body portion 110 and the rear face 252 of the front face portion 120 can be reduced.

Here, if the flexible board 200 is perpendicularly connected to the front face 254 of the main body portion 110 and the flexible board 200 is perpendicularly connected to the rear face 252 of the front face portion 120, the gap between the front face 254 of the main body portion 110 and the rear face 252 of the front face portion 120 cannot be made small. To address this, another recess portion is needed for accommodating the flexible board 200, at the front face 254 of the main body portion 110. This will impede the size reduction of the in-vehicle electronic apparatus. Preferably, the flexible board 200 is connected to the rear face 252 of the front face portion 120 on a slant. More preferably, the flexible board 200 is horizontally connected to the rear face 252 of the front face portion 120.

As shown in FIG. 9, the front face portion 120 includes at the front face 250: the attached/detached portion 170 (housing portion) in which the portable apparatus 10 is housed; and the front face operating portion 130. The attached/detached portion 170 is a recess portion provided at the front face 250 of the front face portion 120. Therefore, if the recess portion 210 is arranged at the attached/detached region 175 opposing to the attached/detached portion 170, the thickness of the main body portion 110 will be increased. Accordingly, as shown in FIG. 11, preferably, the recess portion 210 is arranged at the rear face 252 opposing to the front face operating portion 130.

In accordance with the present exemplary embodiment, a description has been given of an in-vehicle system composed of the in-vehicle apparatus 100 and the portable apparatus 10. However, the present invention is not limited to the in-vehicle apparatus. In addition, the portable apparatus 10 may be composed of a mobile phone with navigation capabilities, portable digital assistance (PDA), or the like. Further, instead of the CD insertion/ejection slot 180 and the CD player 135, there may be provided an insertion/ejection slot and a player of a memory medium such as MD (Mini Disc), DVD (Digital Versatile Disc), memory card, or the like, and there may be provided multiple types of insertion/ejection slots and players.

Although a few specific exemplary embodiments employed in the present invention have been shown and described, it would be appreciated by those skilled in the art that changes may be made in these exemplary embodiments without departing from the principles and spirit of the invention, the scope of which is defined in the claims and their equivalents.

What is claimed is:

1. An electronic apparatus to which a portable apparatus is attachable, the electronic apparatus comprising:
   a main body portion;
   a front face portion; and
   a flexible board connecting the main body portion and the front face portion,
   wherein:
   the front face portion is arranged to be capable of being displaced with respect to the main body portion; and
   a recess portion is defined at the front face portion to be capable of partially accommodating a distorted portion of the flexible board to be distorted when the front face portion is displaced.

2. The electronic apparatus as claimed in claim 1, wherein the portable apparatus is a portable navigation apparatus.

3. An electronic apparatus to which a portable apparatus is attachable, the electronic apparatus comprising:
   a front face portion having a front face and a rear face, the front face being capable of attaching the portable apparatus at the front face of the front face portion;
   a main body portion having a front face; and
   a flexible board connecting the main body portion and the front face portion,
   wherein:
   the main body portion and the front face portion are arranged to be capable of being displaced in a state where the front face of the main body portion opposes to a rear face of the front face portion and in a state where the front face portion is tilted toward the main body portion; and
   a recess portion for accommodating the flexible board is defined at the rear face of the front face portion in a state where the rear face of the front face portion opposes to the front face of the main body portion.

4. The electronic apparatus as claimed in claim 3, wherein a board face of the flexible board is in connection with the front face of the main body portion substantially in perpendicular thereto.

5. The electronic apparatus as claimed in claim 4, wherein:
   the board face of the flexible board is in connection with the rear face of the front face portion substantially in parallel thereto; and the recess portion is defined in a direction from a portion where the flexible board is in connection with the rear face of the front face portion to another portion where the flexible board is in connection with the front face of the main body portion.

6. The electronic apparatus as claimed in claim 3, wherein the recess portion is defined at the rear face of the front face portion, the rear face corresponding to a portion of the front face of the main body portion connected by the flexible board, in a state where the rear face of the front face portion opposes to the front face of the main body portion.

7. The electronic apparatus as claimed in claim 3, wherein:

the front face portion includes a housing portion accommodating the portable apparatus and a front face operating portion; and the housing portion is provided at the rear face opposing to the front face operating portion.

8. The electronic apparatus as claimed in claim 3, wherein the portable apparatus is a portable navigation apparatus.

* * * * *